(12) United States Patent
Lee

(10) Patent No.: US 12,283,671 B2
(45) Date of Patent: Apr. 22, 2025

(54) ENERGY STORAGE SYSTEM INCLUDING SUPERABSORBENT SHEET

(71) Applicant: LG ENERGY SOLUTION, LTD., Seoul (KR)

(72) Inventor: Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 659 days.

(21) Appl. No.: 17/606,870

(22) PCT Filed: Nov. 5, 2020

(86) PCT No.: PCT/KR2020/015427
§ 371 (c)(1),
(2) Date: Oct. 27, 2021

(87) PCT Pub. No.: WO2021/172697
PCT Pub. Date: Sep. 2, 2021

(65) Prior Publication Data
US 2022/0223934 A1 Jul. 14, 2022

(30) Foreign Application Priority Data
Feb. 27, 2020 (KR) .................. 10-2020-0024461

(51) Int. Cl.
*H01M 10/60* (2014.01)
*H01M 10/48* (2006.01)
(Continued)

(52) U.S. Cl.
CPC ....... *H01M 10/613* (2015.04); *H01M 10/482* (2013.01); *H01M 10/486* (2013.01);
(Continued)

(58) Field of Classification Search
CPC ............. H01M 10/613; H01M 10/655; H01M 10/6567; H01M 10/482; H01M 10/486;
(Continued)

(56) References Cited

U.S. PATENT DOCUMENTS

2013/0149582 A1 6/2013 Kimura et al.
2014/0014376 A1 1/2014 Schaefer
(Continued)

FOREIGN PATENT DOCUMENTS

CN 103943913 A 7/2014
CN 206388817 U 8/2017
(Continued)

OTHER PUBLICATIONS

European Extended Search Report issued in Application No. 20921490.7, dated Jun. 21, 2022.
(Continued)

*Primary Examiner* — Raymond Alejandro
(74) *Attorney, Agent, or Firm* — Birch, Stewart, Kolasch & Birch, LLP

(57) ABSTRACT

An ESS (Energy Storage System) is disclosed, which includes a sub ESS stack including a plurality of sub ESSs, each having a plurality of battery modules and a battery rack for accommodating the plurality of battery modules; an ESS housing configured to accommodate the plurality of sub ESSs; a sensor installed in the ESS housing to sense at least one of temperature and smoke inside the ESS housing; a first blocking sheet interposed between the sub ESSs adjacent to each other; a fire extinguishing device configured to supply a fire extinguishing agent into the ESS housing; and a cooling device configured to supply a cooling water to the first blocking sheet.

14 Claims, 4 Drawing Sheets

(51) Int. Cl.
*H01M 10/613* (2014.01)
*H01M 10/655* (2014.01)
*H01M 10/6567* (2014.01)
*H01M 50/209* (2021.01)
*H01M 50/293* (2021.01)

(52) U.S. Cl.
CPC ..... *H01M 10/655* (2015.04); *H01M 10/6567* (2015.04); *H01M 50/209* (2021.01); *H01M 50/293* (2021.01); *H01M 2200/10* (2013.01)

(58) Field of Classification Search
CPC ............. H01M 50/209; H01M 50/293; H01M 2200/10
See application file for complete search history.

(56) References Cited

U.S. PATENT DOCUMENTS

| | | | |
|---|---|---|---|
| 2015/0280190 | A1 | 10/2015 | Ohshiba et al. |
| 2016/0107010 | A1 | 4/2016 | Cordani |
| 2018/0145382 | A1* | 5/2018 | Harris ................ H01M 10/643 |
| 2020/0185672 | A1 | 6/2020 | Seo et al. |

FOREIGN PATENT DOCUMENTS

| | | | |
|---|---|---|---|
| CN | 109103539 | A | 12/2018 |
| CN | 208272071 | U | 12/2018 |
| CN | 208400900 | U | 1/2019 |
| CN | 109985335 | A | 7/2019 |
| DE | 102010034826 | A1 | 2/2012 |
| JP | 2005-317455 | A | 11/2005 |
| JP | 2012-164463 | A | 8/2012 |
| JP | 2012-252909 | A | 12/2012 |
| JP | 2013-89567 | A | 5/2013 |
| JP | 2015-195136 | A | 11/2015 |
| JP | 2018-63766 | A | 4/2018 |
| KR | 10-1706717 | B1 | 3/2017 |
| KR | 10-1918022 | B1 | 11/2018 |
| KR | 10-1939812 | B1 | 1/2019 |
| KR | 10-2019-0089907 | A | 7/2019 |
| KR | 10-2065099 | B1 | 1/2020 |
| KR | 10-2074321 | B1 | 2/2020 |

OTHER PUBLICATIONS

International Search Report (PCT/ISA/210) issued in PCT/KR2020/015427, dated Apr. 26, 2021.

* cited by examiner

«ENERGY STORAGE SYSTEM INCLUDING SUPERABSORBENT SHEET»

ENERGY STORAGE SYSTEM INCLUDING SUPERABSORBENT SHEET

TECHNICAL FIELD

The present disclosure relates to an ESS (Energy Storage System) including a superabsorbent sheet, and more particularly, to an ESS including a superabsorbent sheet, which is adapted for effective cooling just with a relatively small amount of cooling water when an abnormal temperature rise occurs due to heating of a battery module.

The present application claims priority to Korean Patent Application No. 10-2020-0024461 filed on Feb. 27, 2020 in the Republic of Korea, the disclosures of which are incorporated herein by reference.

BACKGROUND ART

In an ESS including a plurality of battery cells, if an abnormality such as a short circuit occurs in some battery cells, the temperature of the battery cells continuously rises. As a result, if the temperature of the battery cells exceeds a critical temperature, a thermal runaway phenomenon occurs. If a thermal runaway phenomenon occurs in some battery cells, safety issues may arise.

If a flame is generated in a battery module including the battery cell due to the thermal runaway phenomenon occurring in some battery cells, the temperature of neighboring battery modules rises rapidly, which may propagate the thermal runaway phenomenon to the entire ESS within a short time.

As a result, if the thermal runaway phenomenon occurring in some battery cells is not quickly handled, the damage caused by the thermal runaway may be expanded to the battery module, which is a battery unit with a larger capacity than the battery cell, or to a sub ESS including a plurality of battery modules. If the expansion of damage caused by the thermal runaway is not appropriately handled, this may lead to disasters such as ignition and explosion of the battery module and the sub ESS, which may cause not only property damage but also safety issues.

Therefore, when flame occurs due to thermal runaway in some battery cells inside the battery module, it is important to block the expansion of the flame generation range inside the sub ESS. In addition, if the flame is already expanded entirely inside one sub ESS, it is important to increase the efficiency of fire extinguishing and cooling so that the flame does not move to sub ESSs adjacent to the sub ESS where the flame is generated.

DISCLOSURE

Technical Problem

The present disclosure is designed to solve the problems of the related art, and therefore the present disclosure is directed to performing proper extinguishing and cooling when the flame is expanded entirely inside one sub ESS, so that the flame does not move to sub ESSs adjacent to the sub ESS where the flame is generated.

In addition, the present disclosure is directed to performing proper extinguishing and cooling so that flame is not propagated to neighboring battery modules, when the flame is generated in some battery modules included in one sub ESS.

However, the technical object to be solved by the present disclosure is not limited to the above, and other objects not mentioned herein will be clearly understood by those skilled in the art from the following disclosure.

Technical Solution

In one aspect of the present disclosure, there is provided an ESS (Energy Storage System), comprising: a sub ESS stack including a plurality of sub ESSs, each sub ESS stack having a plurality of battery modules and a battery rack for accommodating the plurality of battery modules; an ESS housing configured to accommodate the plurality of sub ESSs; a sensor installed in the ESS housing to sense at least one of temperature and smoke inside the ESS housing; a first blocking sheet interposed between the sub ESSs adjacent to each other; a fire extinguisher configured to supply a fire extinguishing agent into the ESS housing; and a cooler configured to supply a cooling water to the first blocking sheet.

The first blocking sheet may be an absorbent sheet.

The first blocking sheet may include an absorbent fiber capable of absorbing and containing 20 g to 200 g of cooling water per 1 g.

The battery module may include a cell stack formed by stacking a plurality of battery cells; and a module housing configured to accommodate the cell stack.

The plurality of battery modules may be stacked along an upper and lower direction inside the battery rack.

The ESS may further comprise at least one second blocking sheet interposed between the battery modules adjacent to each other along the upper and lower direction inside the battery rack.

The second blocking sheet may be disposed to penetrate through the battery rack and traverse from a first side of the sub ESS stack in a stacking direction to second side of the sub ESS stack.

The first blocking sheet may have a first coupling slit, and the second blocking sheet may be inserted into the first coupling slit and coupled to the first blocking sheet.

The second blocking sheet may have a second coupling slit, and the first blocking sheet may be inserted into the second coupling slit and coupled to the second blocking sheet.

The second blocking sheet may be an absorbent sheet.

The second blocking sheet may include an absorbent fiber capable of absorbing and containing 20 g to 200 g of cooling water per 1 g.

The absorbent fiber may include an absorbent resin containing at least one of a starch-based material, a cellulose-based material and a synthetic polymer-based material.

The ESS may further comprise a controller configured to control the operation of the fire extinguisher and the cooler by referring to at least one of the temperature and the smoke sensed by the sensor.

Advantageous Effects

According to an embodiment of the present disclosure, it is possible to perform proper extinguishing and cooling when the flame is expanded entirely inside one sub ESS, so that the flame does not move to sub ESSs adjacent to the sub ESS where the flame is generated.

In addition, according to an embodiment of the present disclosure, it is possible to perform proper extinguishing and cooling so that flame is not propagated to neighboring battery modules, when the flame is generated in some battery modules included in one sub ESS.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

An ESS (Energy Storage System) according to an embodiment of the present disclosure will be described with reference to FIGS. 1 to 4.

Figure 1:
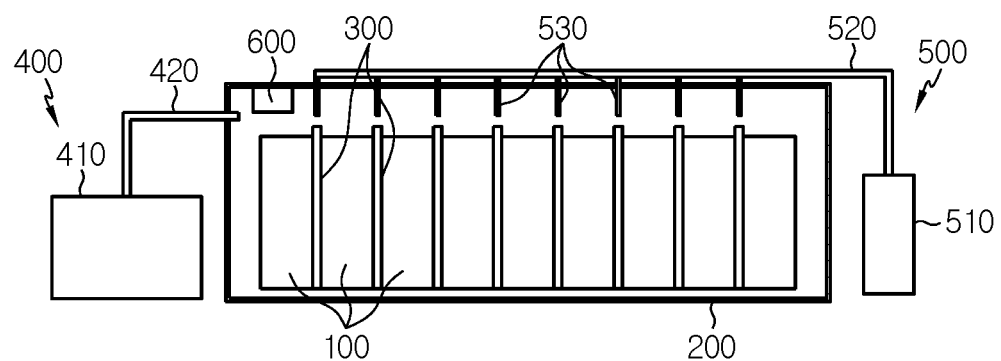
FIG. 1 is a diagram showing an ESS according to an embodiment of the present disclosure.
Figure 2:
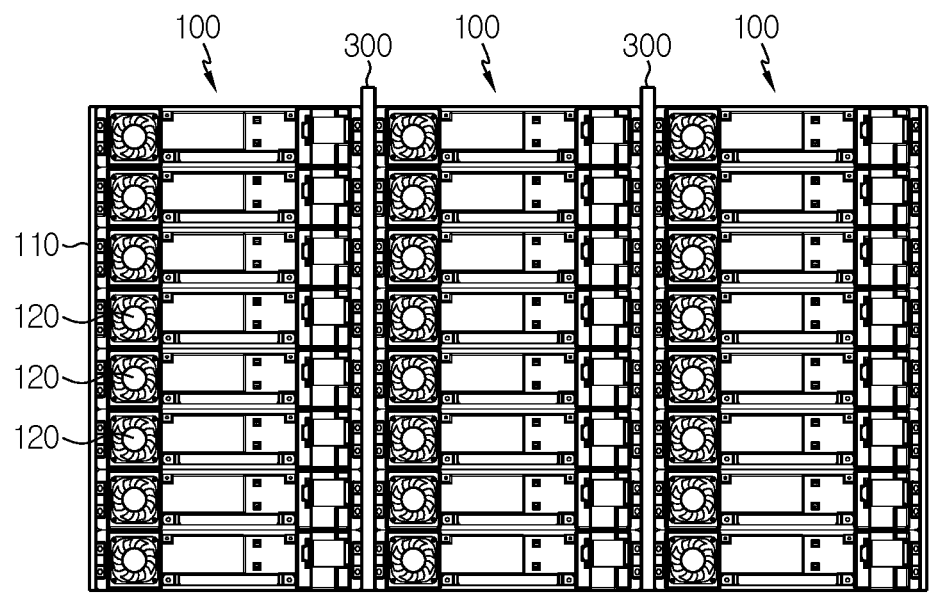
FIG. 2 is a diagram showing a sub ESS and a first blocking sheet, employed at the ESS according to an embodiment of the present disclosure.

First, referring to FIGS. 1 and 2, the ESS according to an embodiment of the present disclosure includes a plurality of sub ESSs 100, an ESS housing 200, a first blocking sheet 300, a fire extinguishing device 400, a cooling device 500 and a sensor 600.

The sub ESS 100 includes a battery rack 110 and a plurality of battery modules 120 accommodated in the battery rack 110. The battery rack 110 has open front and rear surfaces. The plurality of sub ESSs 100 are arranged side by side in a left and right directions so that the side surfaces of the battery racks 110 face each other, thereby forming one sub ESS stack.

Referring to FIG. 2, the plurality of battery modules 120 are stacked in an upper and lower direction inside the battery rack 110 to form one module stack.

Figure 3:
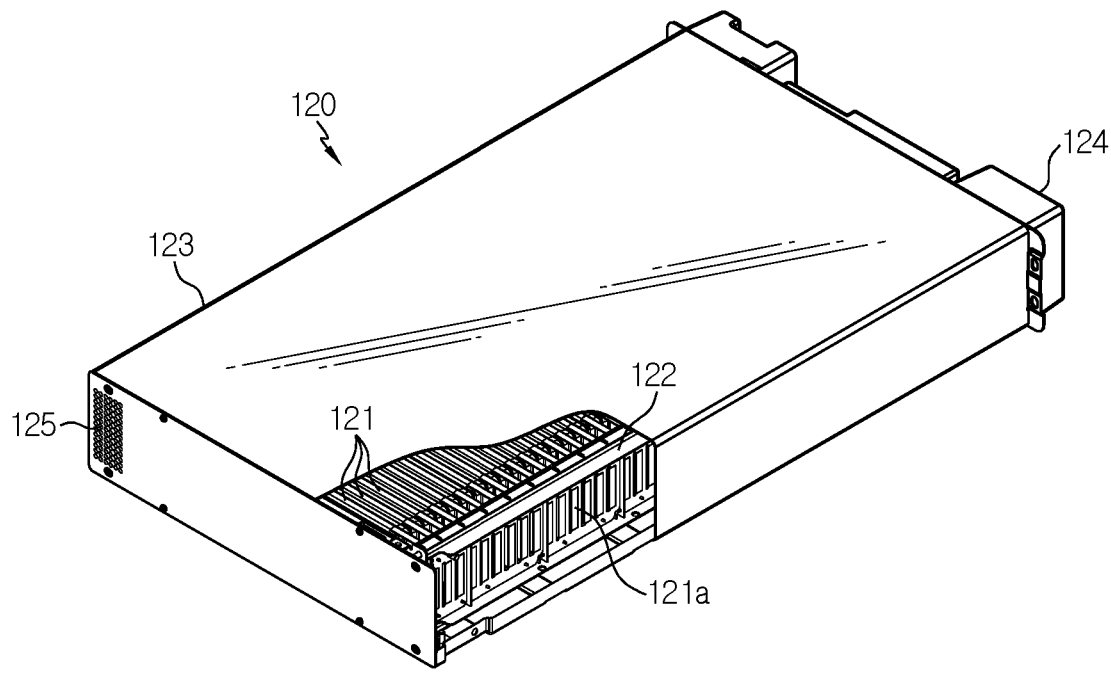
FIG. 3 is a diagram showing a battery module according to the present disclosure.

Referring to FIG. 3, the battery module 120 includes a plurality of battery cells 121, a bus bar frame 122, a module housing 123, an air inlet 124 and an air outlet 125.

The battery cell 121 is provided in plural, and the plurality of battery cells 121 are stacked to form one cell stack. As the battery cell 121, a pouch-type battery cell may be applied, as an example. The battery cell 121 includes a pair of electrode leads 121a, which are respectively drawn to both sides in a longitudinal direction.

The bus bar frame 122 is provided in a pair, and the pair of bus bar frames 122 cover one side and the other side of the cell stack in a width direction, respectively. The electrode lead 121a of the battery cell 121 is drawn out through a slit formed at the bus bar frame 122 and may be bent and electrically connected by the bus bar frame 122.

The module housing 123 has a substantially rectangular parallelepiped shape and accommodates the cell stack therein. The air inlet 124 and the air outlet 125 are formed at one longitudinal side and the other longitudinal side of the module housing 123.

The air inlet 124 is formed at one side of the cell stack in the stacking direction, namely at one longitudinal side of the battery module 120, and is formed in the form of a hole through the module housing 123. The air outlet 125 is formed at the other side of the cell stack in the stacking direction, namely at the other longitudinal side of the battery module 120, and is formed in the form of a hole through the module housing 123.

The air inlet 124 and the air outlet 125 are located at opposite sides diagonally along the longitudinal direction of the battery module 120.

Meanwhile, an empty space is formed between the bus bar frame 122 and the module housing 123. That is, an empty space is formed between one of six outer surfaces of the module housing 123, which faces one longitudinal side and the other longitudinal side of the battery cell 121, and the bus bar frame 122 so that air for cooling the battery cell 121 may flow therethrough. The empty space is formed at both sides of the battery module 120 in the width direction.

The air inlet 124 is formed at a position corresponding to the empty space formed at one side of the battery module 120 in the width direction, and the air outlet 125 is formed at a position corresponding to the empty space formed at the other side of the battery module 120 in the width direction.

In the battery module 120, the air introduced into the battery module 120 through the air inlet 124 cools the battery cell 121 while moving from the empty space formed at one side of the battery module 120 in the width direction to the empty space formed at the other side of the battery module 120 in the width direction, and then is discharged through the air outlet 125. That is, the battery module 120 corresponds to an air-cooled battery module.

Since the battery module 120 applied to the present disclosure has an air-cooled structure as described above, flame is likely to be ejected out of the module housing 123. That is, if an abnormality occurs in some of the battery cells 121 included in the battery module 120 so that the temperature inside the battery cells 121 rises and thus gas is leaked out by venting, a flame may be generated. The generated flame may be ejected out of the module housing 123 through the air inlet 124 and the air outlet 125, which are formed for air cooling.

Referring to FIGS. 1 and 2, when an abnormal temperature rise occurs and thus a flame is generated in some battery module 120 as described above, the first blocking sheet 300 prevents the flame from moving to sub ESSs 100 adjacent to the sub ESS 100 that includes the battery module 120 with the above problem.

To perform the above function, the first blocking sheet 300 is interposed between the sub ESSs 100 adjacent to each other. The first blocking sheet 300 is a super absorbent sheet. That is, the first blocking sheet 300 includes a super absorbent fiber, and the superabsorbent fiber may absorb and contain approximately 20 g to 200 g of cooling water per 1 g. The superabsorbent fiber may include, for example, a super absorbent resin (or a super absorbent polymer) including at least one of a starch-based material, a cellulose-based material or a synthetic polymer-based material. The superabsorbent fiber is obtained by spinning a superabsorbent resin into a net form.

If a cooling water supplied from the cooling device 500, the first blocking sheet 300 may quickly absorb the cooling water, and the first blocking sheet 300 absorbing the cooling water may prevent the abnormal temperature rise and/or the flame occurring in some sub ESS 100 from being propagated to neighboring sub ESSs 100.

The first blocking sheet 300 preferably has an area corresponding to the side surface of the sub ESS 100 in order to minimize the amount of used cooling water and maximize the cooling effect and the flame expansion blocking effect. However, a longitudinal end of the first blocking sheet 300 may be exposed to the top of the sub ESS stack in order to quickly absorb the cooling water supplied from the cooling device 500.

Referring to FIG. 1, the fire extinguishing device 400 sprays the fire extinguishing agent into the ESS housing 200 when the internal temperature of the ESS housing 200 rises above a reference value and/or smoke is sensed, thereby preventing the occurrence of fire in advance or extinguishing the fire that has already occurred. As the fire extinguishing agent, for example, a clean fire extinguishing agent in the form of a gas such as Novec 1230 may be applied, and also, nitrogen and solid aerosol may be applied.

The fire extinguishing device 400 includes a fire extinguishing agent tank 410 installed at an outer side of the ESS housing 200 to store the fire extinguishing agent and an extinguishing agent injection tube 420 having one side connected to the fire extinguishing agent tank 410 and the other side penetrating the ESS housing 200.

If the internal temperature of the ESS housing 200 rises above the reference value and/or smoke is sensed due to fire, the cooling device 500 sprays the cooling water into the ESS housing 200 to prevent the occurrence of fire in advance or extinguish the fire that has already occurred.

More specifically, the cooling device 500 sprays the cooling water directly onto the first blocking sheet 300. The cooling device 500 includes a cooling water supply tube 520 connected to the cooling water tank 510 that stores the cooling water, and a plurality of cooling water injection tubes 530 branched at an end of the cooling water supply tube 520 and disposed at a position corresponding to each first blocking sheet 300.

Even though the drawing of the present disclosure illustrate only the case where the cooling water supply tube 520 is located at the outer side of the ESS housing 200 and the cooling water injection tube 530 passes through the ESS housing 200, the present disclosure is not limited thereto. That is, it is also possible that the cooling water supply tube 520 passes through the ESS housing 200 and the cooling water injection tube 530 is branched from the cooling water supply tube 520 inside the ESS housing 200.

Referring to FIG. 1, the sensor 600 is installed inside the ESS housing 200 to sense at least one of temperature and smoke generation inside the ESS housing. That is, the sensor 600 corresponds to a temperature sensor and/or a smoke sensor.

Although not shown in the drawings, the information sensed by the sensor 600 and/or an alarm according to the sensed information may be displayed through a user interface disposed outside the module housing 200. If a user judges through the sensed information and/or alarm that there is a risk of fire or that a fire has occurred, the user may operate the fire extinguishing device 400 and the cooling device 500 to extinguish or prevent the fire inside the ESS.

Figure 4:
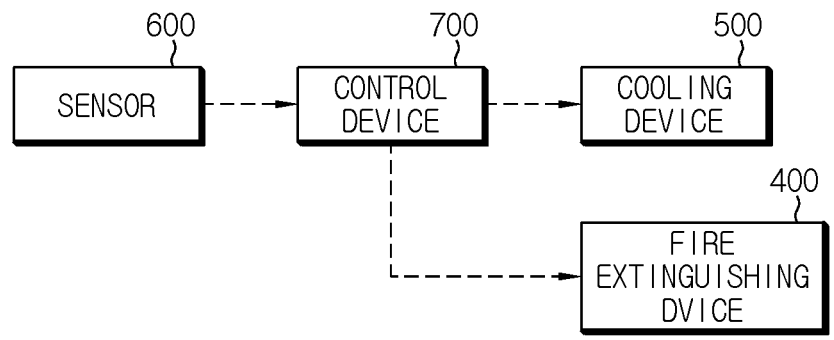
FIG. 4 is a block diagram showing a control logic for automation of fire extinguishing and cooling of the ESS according to an embodiment of the present disclosure.

Meanwhile, referring to FIG. 4, the ESS according to an embodiment of the present disclosure may further include a control device 700, in addition to the above-described components. The control device 700 controls the operation of the fire extinguishing device 400 and the cooling device 500 by referring to the information about temperature and/or the information about smoke generation sensed by the sensor 600.

That is, the control device 700 is an element applied to achieve automation of fire extinguishing and/or cooling by allowing the fire extinguishing device 400 and the cooling device 500 to operate without user manipulation when certain conditions are satisfied. The reference temperatures for operating the fire extinguishing device 400 and the cooling device 500 may be determined in consideration of the number of the sub ESSs 100, the number of battery modules 120 included in the sub ESS 100, the number of battery cells 121 included in the battery module 120, the capacity of the battery cell 121, and the like.

Next, an ESS according to another embodiment of the present disclosure will be described with reference to FIGS. 5 to 8.

The ESS according to another embodiment of the present disclosure is different from the ESS of the former embodiment only in that a second blocking sheet 310 is additionally applied, and other components are substantially the same. Accordingly, in describing the ESS according to another embodiment of the present disclosure, the second blocking sheet 310 will be described in detail, and other components already described in the former embodiment will not be described in detail again.

Figure 5:
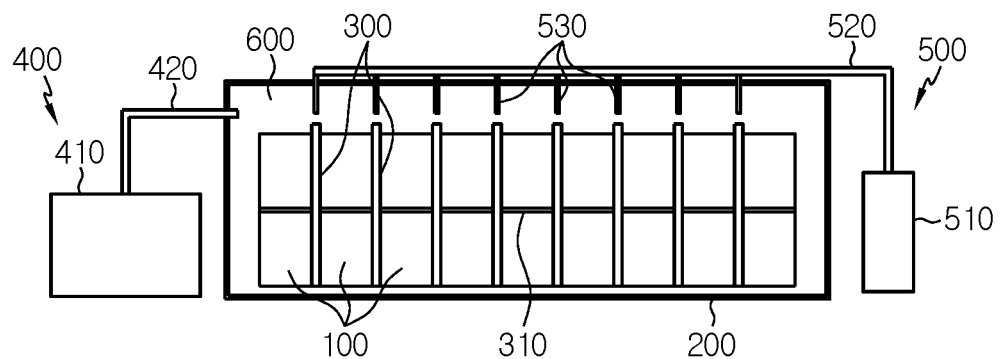
FIG. 5 is a diagram showing an ESS according to another embodiment of the present disclosure.
Figure 6:
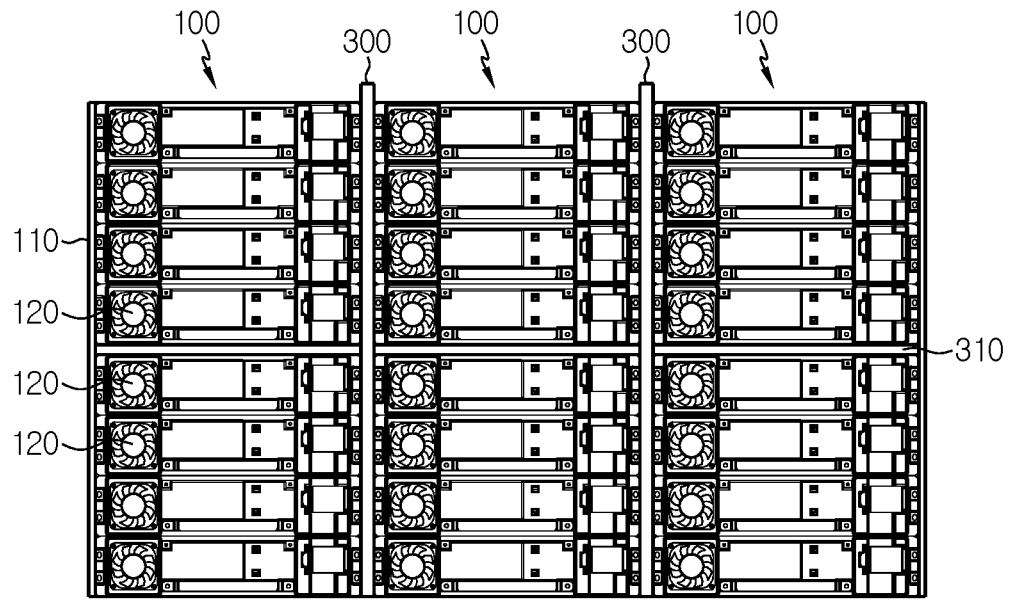
FIG. 6 is a diagram showing a sub ESS, a first blocking sheet and a second blocking sheet, employed at the ESS according to another embodiment of the present disclosure.

Referring to FIGS. 5 and 6, the second blocking sheet 310 is interposed between the battery modules 120 adjacent to each other along the upper and lower direction inside the battery rack 110. The second blocking sheet 310 is disposed to penetrate the side surface of the battery rack 110 and traverse from one side of the sub ESS 100 in the stacking direction to the other side thereof.

One second blocking sheet 310 or a plurality of second blocking sheets 310 may be provided. If only one second blocking sheet 310 is provided, it is efficient that the second blocking sheet 310 is disposed at the center of the battery rack 110 along the stacking direction of the battery module 120. The material of the second blocking sheet 310 is the same as the first blocking sheet 300 described above.

Figure 7:
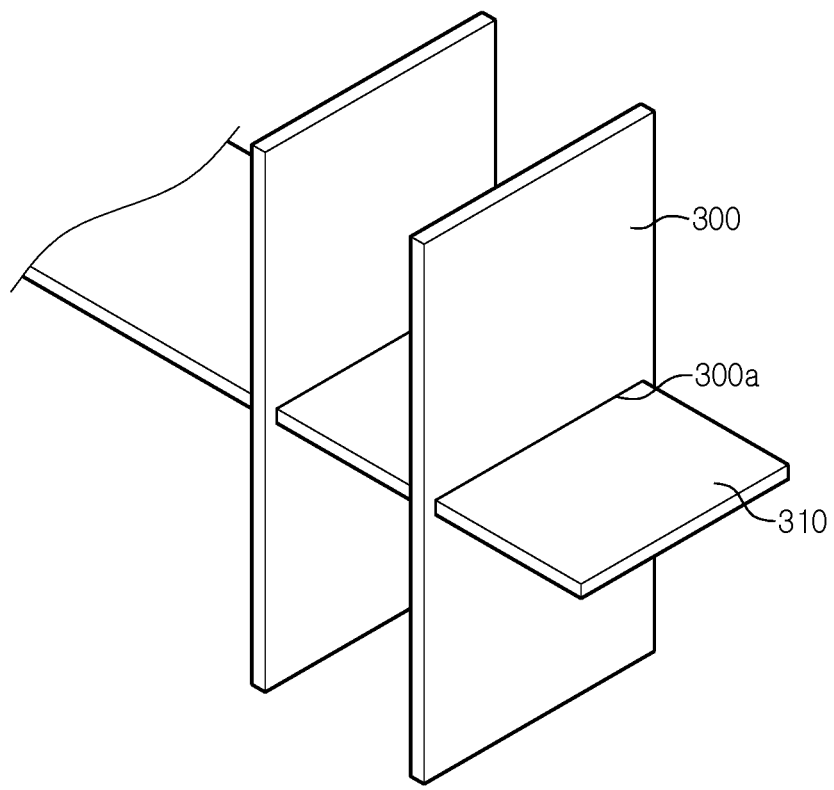
FIGS. 7 and 8 are diagrams showing a coupled configuration of the first blocking sheet and the second blocking sheet, employed at the ESS according to another embodiment of the present disclosure.

Referring to FIG. 7, the first blocking sheet 300 and the second blocking sheet 310 may be coupled to each other by forming a first coupling slit 300a at each first blocking sheet 300 and inserting the second blocking sheet 310 into the first coupling slit 300a. In this case, the position and shape of the first coupling slit 300a formed at the first blocking sheet 300 correspond to a slit (not shown) formed at the side surface of the battery rack 110 for the passage of the second blocking sheet 310.

Figure 8:
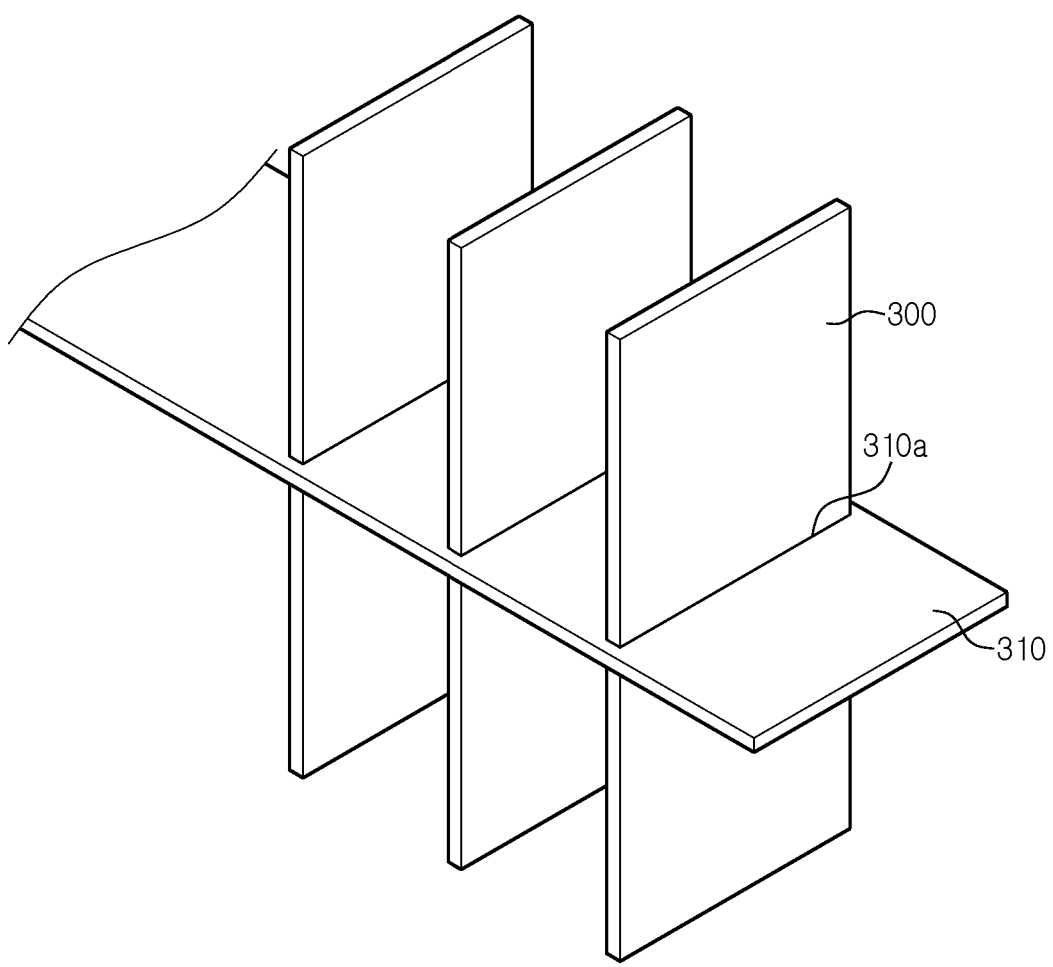

Referring to FIG. 8, the first blocking sheet 300 and the second blocking sheet 310 may be coupled to each other by forming a second coupling slit 310a at the second blocking sheet 310 in a number corresponding to the first blocking sheets 300 and inserting the first blocking sheet 300 into the second coupling slit 310a, unlike that shown in FIG. 7.

As the first blocking sheet 300 and the second blocking sheet 310 are connected to each other in this way, the first blocking sheet 300 may absorb the cooling water supplied from the top of the first blocking sheet 300, and the second blocking sheet 310 may absorb a part of the absorbed cooling water again, thereby preventing the thermal runaway phenomenon from expanding along the stacking direction of the sub ESS stacks and the stacking direction of the battery modules 120.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An energy storage system, comprising
    a sub energy storage system stack including a plurality of sub energy storage systems, each sub energy storage system having a plurality of battery modules and a battery rack for accommodating the plurality of battery modules;
    a housing configured to accommodate the plurality of sub energy storage systems;
    a sensor installed in the housing to sense at least one of temperature and smoke inside the housing;
    a first blocking sheet interposed between the sub energy storage systems adjacent to each other;
    a fire extinguisher configured to supply a fire extinguishing agent into the housing; and
    a cooler configured to supply a cooling water to the first blocking sheet.

2. The energy storage system according to claim 1, wherein the first blocking sheet is an absorbent sheet.

3. The energy storage system according to claim 2, wherein the first blocking sheet includes an absorbent fiber capable of absorbing and containing 20 g to 200 g of cooling water per 1 g.

4. The energy storage system according to claim 3, wherein the absorbent fiber includes an absorbent resin containing at least one of a starch-based material, a cellulose-based material and a synthetic polymer-based material.

5. The energy storage system according to claim 1, wherein the battery module includes:
    a cell stack formed by stacking a plurality of battery cells; and
    a module housing configured to accommodate the cell stack.

6. The energy storage system according to claim 1, wherein the plurality of battery modules are stacked along an upper and lower direction inside the battery rack.

7. The energy storage system according to claim 6, further comprising:
    at least one second blocking sheet interposed between the battery modules adjacent to each other along the upper and lower direction inside the battery rack.

8. The energy storage system according to claim 7, wherein the second blocking sheet is disposed to penetrate through the battery rack and traverse from a first side of the sub energy storage system stack in a stacking direction to a second side of the sub energy storage systems stack.

9. The energy storage system according to claim 8, wherein the first blocking sheet has a first coupling slit, and
    the second blocking sheet is inserted into the first coupling slit and coupled to the first blocking sheet.

10. The energy storage system according to claim 8, wherein the second blocking sheet has a second coupling slit, and
    the first blocking sheet is inserted into the second coupling slit and coupled to the second blocking sheet.

11. The energy storage system according to claim 7, wherein the second blocking sheet is an absorbent sheet.

12. The energy storage system according to claim 7, wherein the second blocking sheet includes an absorbent fiber capable of absorbing and containing 20 g to 200 g of cooling water per 1 g.

13. The energy storage system according to claim 12, wherein the absorbent fiber includes an absorbent resin containing at least one of a starch-based material, a cellulose-based material and a synthetic polymer-based material.

14. The energy storage system according to claim 1, further comprising:
    a controller configured to control the operation of the fire extinguisher and the cooler by referring to at least one of the temperature and the smoke sensed by the sensor.

* * * * *